United States Patent
Amit et al.

(10) Patent No.: US 7,546,586 B2
(45) Date of Patent: Jun. 9, 2009

(54) MULTI-INTERFACE AWARE SCENARIO EXECUTION ENVIRONMENT

(75) Inventors: Amit Amit, Redmond, WA (US); Marcelo V. Vago, Redmond, WA (US); YiCheng Michael Lin, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 886 days.

(21) Appl. No.: 11/059,113

(22) Filed: Feb. 15, 2005

(65) Prior Publication Data

US 2006/0183085 A1    Aug. 17, 2006

(51) Int. Cl.
  *G06F 9/44* (2006.01)
(52) U.S. Cl. .................. 717/124; 717/126; 717/127
(58) Field of Classification Search ......... 717/106–109, 717/124–135
   See application file for complete search history.

(56) References Cited

U.S. PATENT DOCUMENTS

| | | | |
|---|---|---|---|
| 5,907,707 A | 5/1999 | Ramalingam et al. | |
| 6,067,639 A | 5/2000 | Rodrigues et al. | |
| 6,163,880 A | 12/2000 | Ramalingam et al. | |
| 6,408,403 B1 | 6/2002 | Rodrigues et al. | |
| 7,272,822 B1 * | 9/2007 | Riggins et al. | 717/124 |
| 7,313,564 B2 * | 12/2007 | Melamed et al. | 707/101 |
| 7,334,220 B2 * | 2/2008 | Chang et al. | 717/126 |
| 2002/0188890 A1 * | 12/2002 | Shupps et al. | 714/38 |
| 2003/0046448 A1 * | 3/2003 | Fischer et al. | 709/328 |
| 2003/0097650 A1 * | 5/2003 | Bahrs et al. | 717/124 |
| 2003/0208744 A1 | 11/2003 | Amir et al. | |
| 2004/0103344 A1 | 5/2004 | Stephens et al. | |
| 2004/0167749 A1 * | 8/2004 | Friedman et al. | 702/186 |
| 2004/0225952 A1 | 11/2004 | Brown et al. | |
| 2005/0015702 A1 | 1/2005 | Shier et al. | |
| 2005/0027783 A1 | 2/2005 | Green et al. | |
| 2005/0071805 A1 * | 3/2005 | Lauterbach et al. | 717/104 |
| 2005/0086022 A1 * | 4/2005 | Lindberg et al. | 702/123 |
| 2005/0195390 A1 * | 9/2005 | Jeon et al. | 356/237.2 |

* cited by examiner

*Primary Examiner*—Wei Y Zhen
*Assistant Examiner*—Matthew J Brophy
(74) *Attorney, Agent, or Firm*—Wolf, Greenfield & Sacks, P.C.

(57) ABSTRACT

A scenario execution environment (SEE) may include one or more action layers. Each action layer may be associated with one or more SEE actions. Each SEE action may be associated with one or more action layers. SEE code may specify one or more SEE actions. The SEE code may be parsed for the SEE actions. Each SEE action may be dispatched to each associated action layer. The action layer interface may include a start scenario element, an end scenario element and a run action element. The start scenario element may inform the action layer that one or more scenarios of the scenario execution environment are commencing. The end scenario element may inform the action layer that one or more scenarios are concluding. The run action element may instruct the action layer to carry out one or more SEE actions associated with one or more scenarios.

18 Claims, 9 Drawing Sheets

MULTI-INTERFACE AWARE SCENARIO EXECUTION ENVIRONMENT

FIELD OF THE INVENTION

This invention pertains generally to computer systems and, more particularly, to computer systems having sub-systems, services and/or components with interfaces.

BACKGROUND OF THE INVENTION

Computer systems, and particularly networked computer systems, have become complex. An aspect of this complexity is that, at times, computers systems may behave in unexpected ways. This generally causes consternation among computer system users and may prompt calls to a computer system support organization. One challenge for the support organization is determining whether the behavior at issue is unexpected in general, and possibly undesirable, or merely unexpected to a particular user.

The challenge is greater than might be anticipated at first glance. Support organizations typically have multiple layers with increasingly specialized experts. However, even high expertise with a particular computer system may be degraded by the constant release of new computer systems, sub-systems, services, and components, new versions of existing computer systems, sub-systems, services, and components, new interfaces to existing computer systems, sub-systems, services, and components, and the like. In such an environment, documentation may quickly become outdated and unreliable. The line between expected and unexpected behavior may become ambiguous, forcing the support organization to fall back on, at best, educated guesswork.

Rising above guesswork means being able to reproduce and analyze questionable behavior, but again this is easier said that done. One problem is translation between user-perceived categories of system functionality and categories of system functionality as implemented. Test cases designed to test categories of system functionality as implemented may be inappropriate and/or inadequate to test categories of system functionality as perceived by system users. An example of this is the now common case that multiple and layered interfaces, such as graphical user interfaces (GUI), command line interfaces (CLI), and application programming interfaces (API), exist to the same sub-system, service or component. A computer system user perspective of a set of interfaces may include multiple and/or different test cases relative to the perspective of a computer system implementer, and vice versa.

BRIEF SUMMARY OF THE INVENTION

This section presents a simplified summary of some embodiments of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

A scenario execution environment may include one or more action layers. Each action layer may be associated with one or more scenario execution environment (SEE) actions. Each SEE action may be associated with one or more action layers. Scenario execution environment (SEE) code may specify one or more SEE actions. In an embodiment of the invention, the SEE code may be parsed for the SEE actions. One or more action layers associated with the SEE actions may be identified. Each SEE action may be dispatched to each associated action layer. In an embodiment of the invention, a scenario execution engine is configured to parse the SEE code, identify associated action layers and dispatch the SEE actions.

Each action layer may have an interface in accordance with an action layer interface. In an embodiment of the invention, the action layer interface includes a start scenario element, an end scenario element and a run action element. The start scenario element may inform the action layer that one or more scenarios of the scenario execution environment are commencing. The end scenario element may inform the action layer that one or more scenarios of the scenario execution environment are concluding. The run action element may instruct the action layer to carry out one or more SEE actions associated with one or more scenarios of the scenario execution environment.

BRIEF DESCRIPTION OF THE DRAWINGS

While the appended claims set forth the features of the invention with particularity, the invention and its advantages are best understood from the following detailed description taken in conjunction with the accompanying drawings, of which:

DETAILED DESCRIPTION OF THE INVENTION

Prior to proceeding with a description of the various embodiments of the invention, a description of a computer in which the various embodiments of the invention may be practiced is now provided. Although not required, the invention will be described in the general context of computer-executable instructions, such as program modules, being executed by a computer. Generally, programs include routines, objects, components, data structures and the like that perform particular tasks or implement particular abstract data types. The term "program" as used herein may connote a single program module or multiple program modules acting in concert. The terms "computer" and "computing device" as used herein include any device that electronically executes one or more programs, such as personal computers (PCs), hand-held devices, multiprocessor systems, microprocessor-based programmable consumer electronics, network PCs, minicomputers, tablet PCs, laptop computers, consumer appliances having a microprocessor or microcontroller, routers, gateways, hubs and the like. The invention may also be employed in distributed computing environments, where tasks are performed by remote processing devices that are linked through a communications network. In a distributed computing environment, programs may be located in both local and remote memory storage devices.

Figure 1:
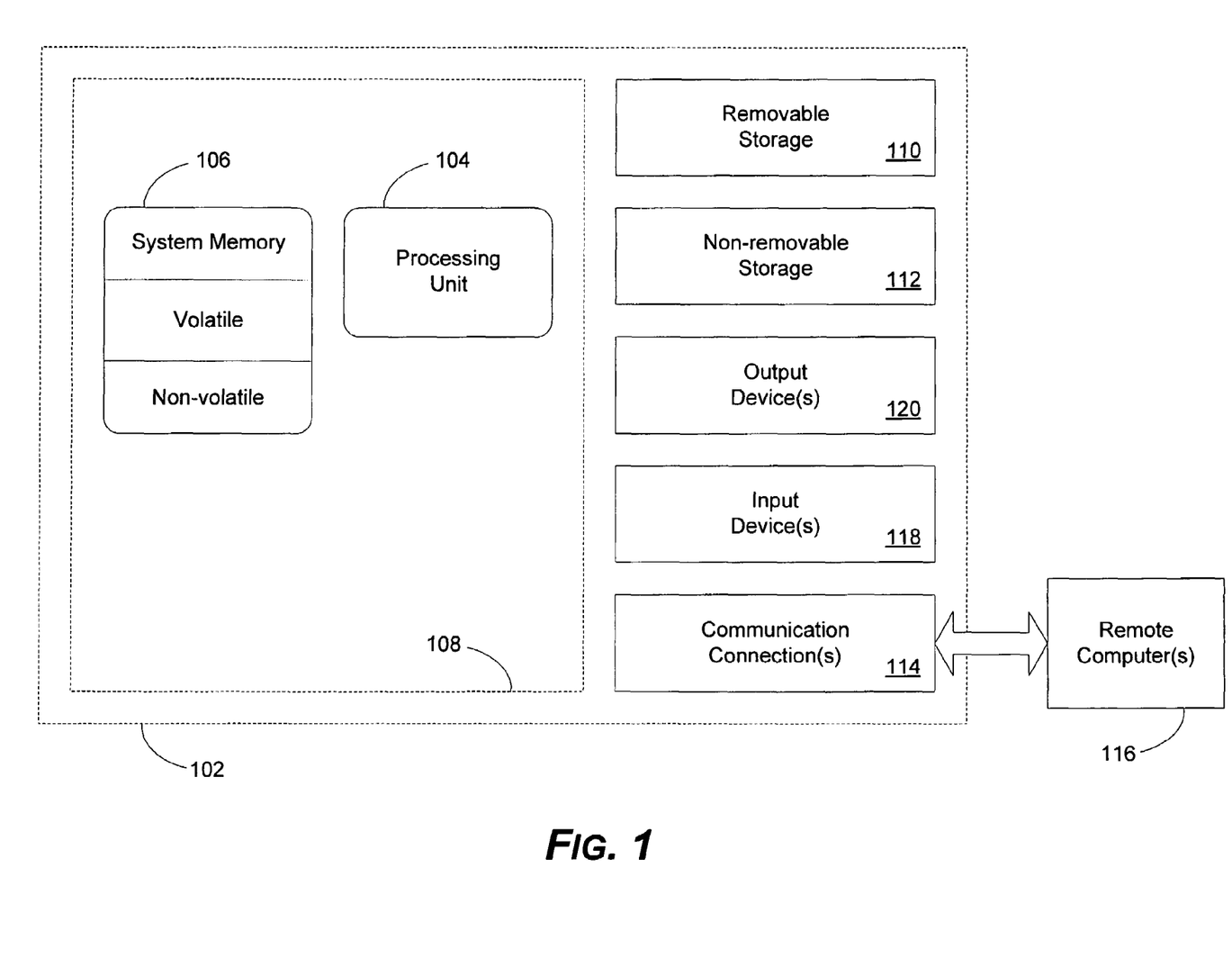
FIG. 1 is a schematic diagram generally illustrating an exemplary computer system usable to implement an embodiment of the invention.

Referring to FIG. 1, an example of a basic configuration for the computer 102 on which aspects of the invention described herein may be implemented is shown. In its most basic configuration, the computer 102 typically includes at least one processing unit 104 and memory 106. The processing unit 104 executes instructions to carry out tasks in accordance with various embodiments of the invention. In carrying out such tasks, the processing unit 104 may transmit electronic signals to other parts of the computer 102 and to devices outside of the computer 102 to cause some result. Depending on the exact configuration and type of the computer 102, the memory 106 may be volatile (such as RAM), non-volatile (such as ROM or flash memory) or some combination of the two. This most basic configuration is illustrated in FIG. 1 by dashed line 108.

The computer 102 may also have additional features/functionality. For example, computer 102 may also include additional storage (removable 110 and/or non-removable 112) including, but not limited to, magnetic or optical disks or tape. Computer storage media includes volatile and non-volatile, removable and non-removable media implemented in any method or technology for storage of information, including computer-executable instructions, data structures, program modules, or other data. Computer storage media includes, but is not limited to, RAM, ROM, EEPROM, flash memory, CD-ROM, digital versatile disk (DVD) or other optical storage, magnetic cassettes, magnetic tape, magnetic disk storage or other magnetic storage devices, or any other medium which can be used to stored the desired information and which can be accessed by the computer 102. Any such computer storage media may be part of computer 102.

The computer 102 preferably also contains communications connections 114 that allow the device to communicate with other devices such as remote computer(s) 116. A communication connection is an example of a communication medium. Communication media typically embody computer readable instructions, data structures, program modules or other data in a modulated data signal such as a carrier wave or other transport mechanism and includes any information delivery media. By way of example, and not limitation, the term "communication media" includes wireless media such as acoustic, RF, infrared and other wireless media. The term "computer-readable medium" as used herein includes both computer storage media and communication media.

The computer 102 may also have input devices 118 such as a keyboard/keypad, mouse, pen, voice input device, touch input device, etc. Output devices 120 such as a display, speakers, a printer, etc. may also be included. All these devices are well known in the art and need not be described at length here.

In the description that follows, the invention will be described with reference to acts and symbolic representations of operations that are performed by one or more computing devices, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

In an embodiment of the invention, a bridge is built between user-perceived categories of system functionality and categories of system functionality as implemented with a scenario execution environment (SEE). The scenario execution environment may provide an ability to view and edit scenario specifications, to execute scenarios in accordance with scenario specifications and to view scenario execution results and scenario execution history. The scenario execution environment may provide for an efficient and/or enabling organizational division, for example, enabling a customer support organization to create new scenarios with existing functionality developed by a, perhaps more technical, product testing organization.

The task of allocating scenario creation and management features to an organizational division may be a delicate one. Too few features and demands for scenarios implemented with custom code may be little reduced. Too many features and the skill level required to implement a new scenario may be little different from custom coding. In an embodiment of the invention, a sub-system, service or component (service) with multiple interfaces may be treated as a single category of system functionality, for example, enabling specification of a single scenario set for a service that is operative with multiple interfaces of the service. In addition, a scenario may include deliberate interruptions to system functionality, such as a system restart, without having to be explicitly divided into pre-interruption and post-interruption partitions.

Figure 2:
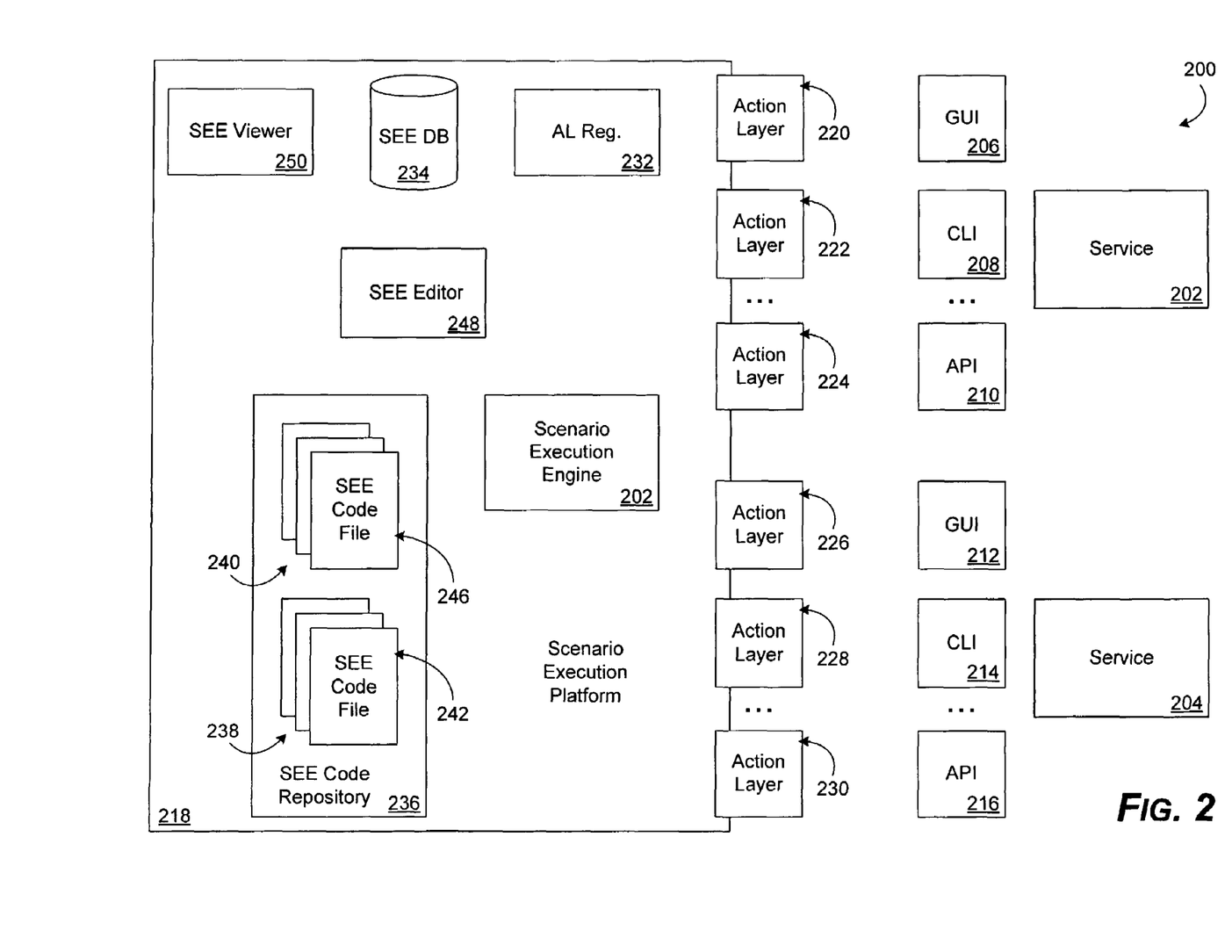
FIG. 2 is a schematic diagram illustrating an example scenario execution environment architecture in accordance with an embodiment of the invention.

FIG. 2 provides a high level overview of an example scenario execution environment 200 architecture in accordance with an embodiment of the invention. Multiple services 202, 204 such as file system services, distributed file system services, input/output services, device input/output services, network services, and/or any suitable computer system services, may each have multiple interfaces 206, 208, 210, 212, 214, 216. For example, interfaces 206, 208, 210 of a first service 202 may include a graphical user interface (GUI) 206, a command line interface (CLI) 208 and an application programming interface (API) 210. In this example, interfaces 212, 214, 216 of a second service 204 also include a graphical user interface (GUI) 212, a command line interface (CLI) 214 and an application programming interface (API) 216. Services may have more or less interfaces than shown in FIG. 2. In addition, the interfaces 206, 208, 210, 212, 214, 216 of each service 202, 204 may be ordered and/or be arranged in one or more hierarchies. For example, the graphical user interface 206 of the service 202 may be a higher level interface than the application programming interface 210 of the service 202.

Each interface 206, 208, 210, 212, 214, 216 may include one or more service 202, 204 functionality invocation mechanisms. For example, the application programming interface 210 may include one or more functions taking one or more parameters, or accept one or more messages including one or more data fields, or any suitable application programming interface element. The command line interface 208 may accept a string of alphanumeric characters including one or more command words and one or more parameters, or any suitable command line interface element. The graphical user interface 206 may include one or more interactive graphical elements such as graphical dialogs, graphical buttons, graphical sliders, text input fields, or any suitable graphical user interface element.

A scenario execution platform 218 may interact with the interfaces 206, 208, 210, 212, 214, 216 of the services 202, 204 through action layers 220, 222, 224, 226, 228, 230. There may be an action layer 220, 222, 224, 226, 228, 230 for each interface 206, 208, 210, 212, 214, 216 of each service 202, 204. For example, the action layer 220 may correspond to the graphical user interface 206 of the service 202, the action layer 222 may correspond to the command line interface 208 of the service 202, the action layer 224 may correspond to the application programming interface 210 of the service 202, the action layer 226 may correspond to the graphical user interface 212 of the service 204, the action layer 228 may correspond to the command line interface 214 of the service 204 and the action layer 230 may correspond to the application programming interface 216 of the service 204.

The action layers 220, 222, 224, 226, 228, 230 may be ordered and/or arranged in one or more hierarchies. For example, a hierarchy of the action layers 220, 222, 224, 226, 228, 230 may correspond to a hierarchy of the interfaces 206, 208, 210, 212, 214, 216. The action layers 220, 222, 224, 226, 228, 230 may be grouped into one or more action layer groups. For example, the action layers 220, 222, 224, 226, 228, 230 may be grouped according to an associated service 202, 204. Each action layer 220, 222, 224, 226, 228, 230 may include one or more scenario execution environment (SEE) actions. Each SEE action may activate one or more elements of one or more interfaces 206, 208, 210, 212, 214, 216 of one or more services 202, 204 of the scenario execution environment 200, for example, graphical user interface 206, 212 elements, command line interface 208, 214 elements, and/or application programming interface 210, 216 elements.

Each action layer 220, 222, 224, 226, 228, 230 may have an action layer interface. The action layer interface of each action layer 220, 222, 224, 226, 228, 230 may be the same, enabling the action layers 220, 222, 224, 226, 228, 230 to be treated in a uniform manner by components of the scenario execution platform 218. The scenario execution platform 218 may require that each action layer 220, 222, 224, 226, 228, 230 conforms to a particular action layer interface or to one of a set of particular action layer interfaces. An example action layer interface in accordance with an embodiment of the invention is described in more detail below with reference to FIG. 5. Action layers 220, 222, 224, 226, 228, 230 may be implemented as shared libraries, component object model (COM) servers, message-driven servers, or any suitable computerized system component having an interface.

An action layer registration tool 232 may register the action layers 220, 222, 224, 226, 228, 230 with a scenario execution environment database (SEE DB) 234. Action layer 220, 222, 224, 226, 228, 230 information registered by the action layer registration tool 232 may include names associated with each action layer 220, 222, 224, 226, 228, 230, SEE actions associated with each action layer 220, 222, 224, 226, 228, 230, services 202, 204 associated with each action layer 220, 222, 224, 226, 228, 230, service interfaces 206, 208, 210, 212, 214, 216 associated with each action layer 220, 222, 224, 226, 228, 230, relationships between action layers 220, 222, 224, 226, 228, 230, relationships between service interfaces 206, 208, 210, 212, 214, 216 referenced by action layers 220, 222, 224, 226, 228, 230, and relationships between services 202, 204 referenced by action layers 220, 222, 224, 226, 228, 230.

A scenario execution environment (SEE) code repository 236 may store one or more sets 238, 240 of scenario execution environment (SEE) code files 242, 244. The SEE code repository 236 may be a part of the SEE database 234. The SEE code files 242, 244 may be static or dynamically generated from data stored in the SEE code repository 236 and/or the SEE database 234. The SEE code files 242, 244 may include scenario execution environment (SEE) code specifying scenarios for execution in the scenario execution environment 200. The sets 238, 240 of SEE code files may grouped with respect to computer systems, sets of services such as the services 202, 204, and/or SEE code or SEE code file 242, 244 versions.

The role played by the SEE code files 242, 244 is not limited to SEE code stored in conventional computerized file system formats. SEE code may be stored in any suitable stand-alone or embedded data structure. SEE code may be implemented with an extensible markup language (XML), for example, an extensible markup language in accordance with the World Wide Web Consortium® (W3C®) Recommendation titled *Extensible Markup Language (XML)* 1.0 (*Third Edition*) dated Feb. 4, 2004. An example SEE code format in accordance with an embodiment of the invention is described below in more detail with reference to FIG. 4.

A scenario execution engine 246 may execute scenarios in the scenario execution environment 200 as specified by SEE code, for example, stored in SEE code files 242, 244. The scenario execution engine 246 may implement execution of scenarios by invoking SEE actions, for example, by invoking SEE actions specified by SEE code. Further details of the scenario execution engine 246 in accordance with an embodiment of the invention are described below with reference to FIG. 3.

SEE code, for example, SEE code in the SEE code files 242, 244, may be in accordance with the action layer 220, 222, 224, 226, 228, 230 information registered by the action layer registration tool 232 in the SEE database 234. For example, each SEE action and/or each scenario specified by SEE code may have a corresponding entry in the SEE database 234. In an embodiment of the invention, accordance between SEE code and the SEE database 234 is encouraged by the provision of a scenario execution environment (SEE) editor 248. In an embodiment of the invention, accordance between SEE code and the SEE database 234 is enforced by requiring that SEE code be edited with the SEE editor 248 and/or by verifying that SEE code is in accordance with the SEE database 234 prior to execution by the scenario execution engine 246.

The SEE editor 248 may present SEE actions of action layers 220, 222, 224, 226, 228, 230 that are registered with the SEE database 234. For example, the SEE editor 248 may include a graphical user interface (GUI) and the SEE actions may be presented in a visual arrangement such as a list or a tree. The SEE actions may be grouped and/or sorted, for example, by associated action layer 220, 222, 224, 226, 228, 230, associated service 202, 204, frequent usage, popularity, associated date such as creation date or most recent revision date, and/or any suitable associated information in the SEE database 234. SEE code, for example in SEE code files 242, 244, may be edited by "dragging and dropping" SEE actions from the visual presentation into the SEE code. Automatic completion of keyboard-entered SEE code and like coding productivity enhancement utilities may also be provided by the SEE editor 248.

A scenario execution engine (SEE) viewer 250 may present SEE code and scenarios specified by SEE code in the SEE code repository 236 to scenario execution environment 200 users, for example, with a graphical user interface. The SEE viewer 250 may enable initiation of scenario and/or SEE code execution in the scenario execution environment 200. In addition, the SEE viewer 250 may present scenario editing history and execution history associated with particular scenarios and versions of scenarios and/or particular SEE code and versions of particular SEE code. Scenario execution history may include execution times and dates, and scenario execution results including high level summaries such as "pass" or "fail," as well as detailed execution transcripts. In an embodiment of the invention, the SEE viewer 250 is integrated with the SEE editor 248.

Figure 3:
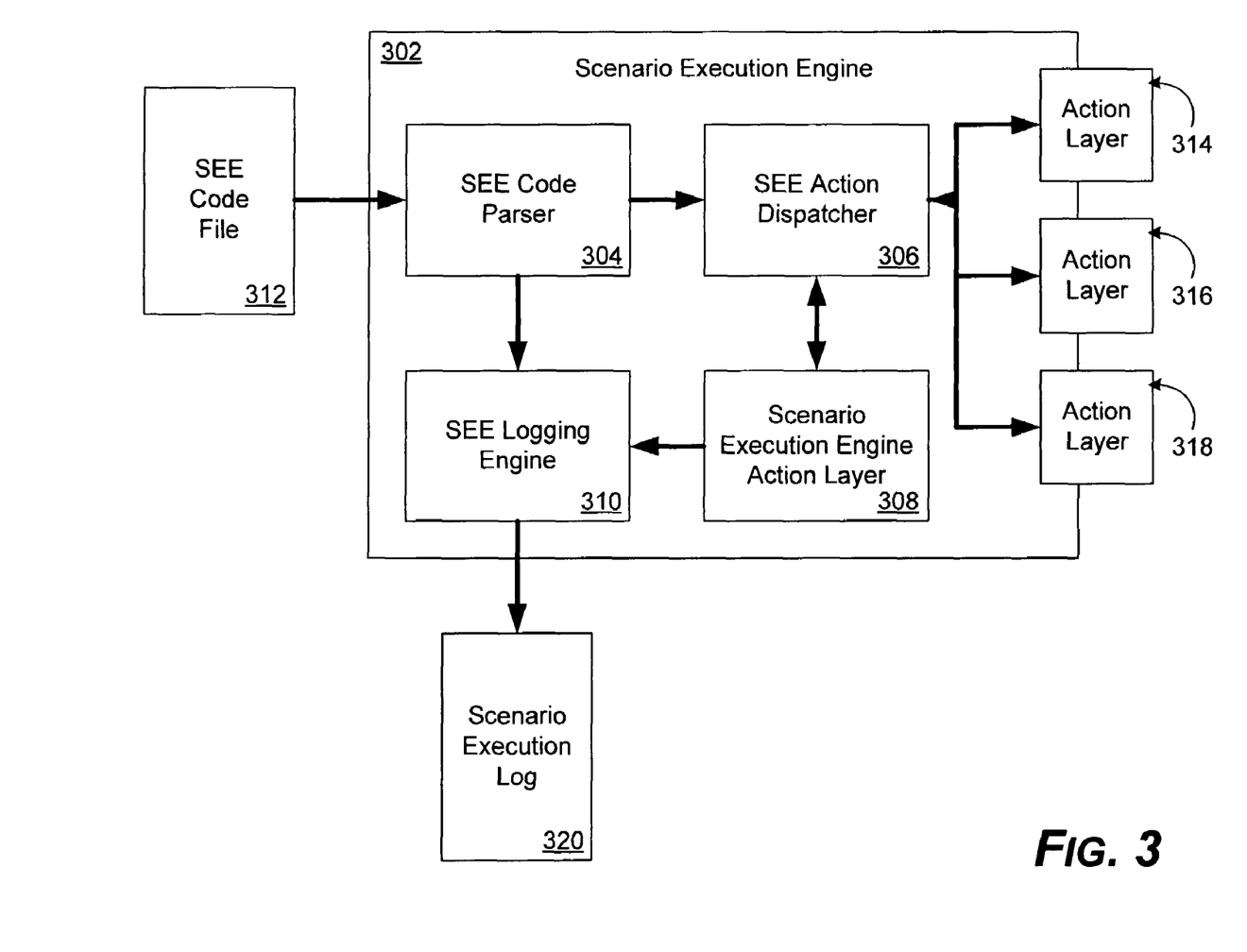
FIG. 3 is a schematic diagram illustrating an example scenario execution engine architecture in accordance with an embodiment of the invention.

FIG. 3 depicts an example architecture for a scenario execution engine 302 in accordance with an embodiment of the invention. The scenario execution engine 302 is suitable for the role of the scenario execution engine 246 as described above with reference to FIG. 2. The scenario execution engine 302 may include a SEE code parser 304, a SEE action dispatcher 306, a scenario execution engine action layer 308 and a scenario execution environment (SEE) logging engine 310.

The SEE code parser 304 may parse SEE code, for example, from a SEE code file 312. The SEE code file 312 may be one of the sets 238, 240 (FIG. 2) of SEE code files in the SEE code repository 236. In an embodiment of the invention, the SEE code parser 304 is a conventional extensible markup language parser. The SEE code parser 304 may be shared with other components of the scenario execution platform 200.

SEE code in the SEE code file 312 may specify one or more action layers 220, 222, 224, 226, 228, 230 (FIG. 2) associated with SEE actions incorporated in one or more scenarios. The scenario execution engine 302 may load (e.g., establish intra-process or inter-process communication with in an intra-process or inter-process communications environment such as a computer system and/or computer operating system) the specified set of action layers, represented in FIG. 3 by action layers 314, 316 and 318. The SEE action dispatcher 306 may receive parsed SEE code from the SEE code parser 304. The parsed SEE code may specify that one or more sets of SEE actions are to be performed in one or more orders. The SEE action dispatcher may dispatch the specified SEE actions in the specified orders, for example, utilizing the action layer interface of action layers 314, 316, 318 associated with the specified SEE actions.

Some of the SEE actions specified by SEE code may be scenario execution engine actions, that is, SEE actions associated with the scenario execution platform 218 (FIG. 2) rather than, for example, with a particular service interface 206, 208, 210, 212, 214, 216 and/or a particular service 202, 204. In an embodiment of the invention, the scenario execution engine action layer 308 provides an interface for initiating each scenario execution engine action. The interface of the scenario execution engine action layer 308 may be the same as the action layer interface of the action layers 314, 316 and 318. Although shown in FIG. 3 as integrated into the scenario execution action 302, in an embodiment of the invention, the scenario execution action layer 308 is loaded in a manner similar to the action layers 314, 316 and 318.

Components of the scenario execution engine 302 such as the SEE code parser 304 and the scenario execution engine action layer 308 may log scenario request, initialization and execution results with the SEE logging engine 310. The SEE logging engine 310 may generate a scenario execution log 320 for each scenario and/or set of scenarios specified by SEE code, for example, in the SEE code file 312. The scenario execution log 320 may be stored in the SEE database 234 (FIG. 2) and associated with the scenario and/or set of scenarios that generated the scenario execution log 320.

Figure 4:
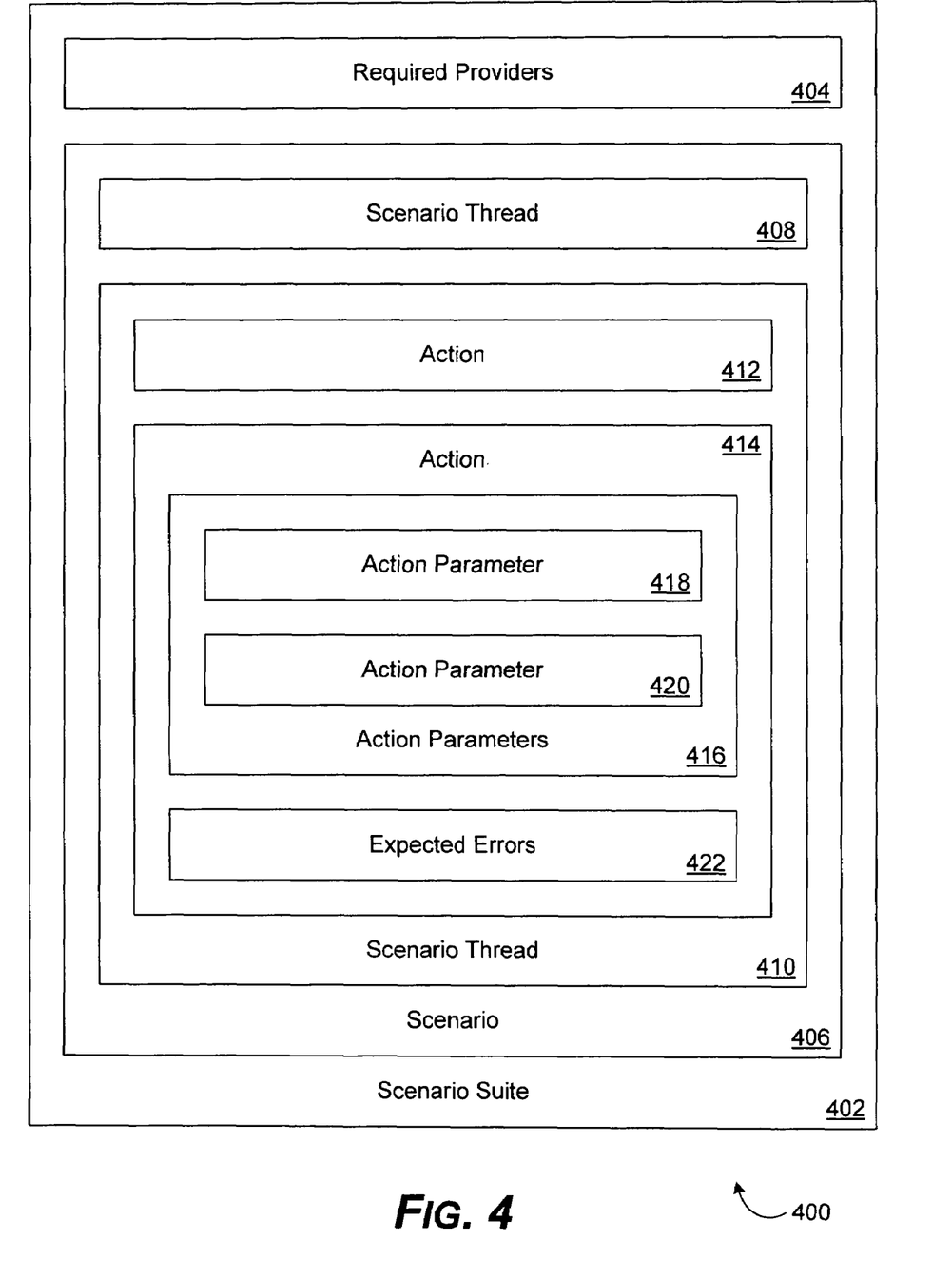
FIG. 4 is a data structure diagram depicting an example scenario execution environment (SEE) code format in accordance with an embodiment of the invention.

Before describing operation of the scenario execution environment 200 (FIG. 2) in more detail, it will be helpful to provide details with respect to SEE code formats and action layer interfaces. FIG. 4 depicts an example SEE code format 400 in accordance with an embodiment of the invention. The SEE code format 400 includes multiple nested SEE code format elements. The SEE code format 400 may correspond to an extensible markup language format. Each element of the SEE code format 400 may correspond to an extensible markup language element.

The SEE code in the SEE code format 400 may specify one or more scenarios in a scenario suite. A scenario suite element 402 may include a required providers element 404 and one or more scenario elements such as scenario element 406. For clarity, only one scenario element 406 is shown in FIG. 4. The scenario suite element 402 may group and name the set of scenarios in the scenario suite. The scenario element 406 may name an associated scenario.

The required providers element 404 may specify a set of services 202, 204 (FIG. 2) and/or a set of action layers 220, 222, 224, 226, 228, 230 associated with the scenario suite. For example the required providers element 404 may include one or more provider elements (not shown in FIG. 4) each specifying a particular service 202, 204, and each provider element may include one or more action layer elements (not shown in FIG. 4) each specifying a particular action layer 220, 222, 224, 226, 228, 230. The required providers element 404 may further specify relationships between action layers 220, 222, 224, 226, 228, 230, service interfaces 206, 208, 210, 212, 214, 216, and/or services 202, 204.

Each scenario may have one-or more associated threads of execution ("scenario threads") enabling, for example, a plurality of steps to be performed in parallel. Correspondingly, the scenario element 406 may include one or more scenario thread elements. In FIG. 4, the scenario element 406 is shown having two scenario thread elements 408 and 410, however, an embodiment of the invention is not so limited. Each scenario thread element may name its associated thread of execution. Each scenario thread may perform one or more SEE actions. Correspondingly, each scenario thread element 408, 410 may include one or more action elements. In FIG. 4, the scenario thread 410 is shown having two action elements 412 and 414. However, an embodiment of the invention is not so limited.

Each action element 412, 414 may specify its associated SEE action. The specified SEE action may be associated with a provider such as a particular service 202, 204 (FIG. 2) and/or action layer 220, 222, 224, 226, 228, 230. Correspondingly, each action element 412, 414 may further specify the provider associated with the specified SEE action. The specified SEE action may have an expected result, for example, "pass" or "fail." Correspondingly, each action element 412, 414 may further specify the expected result associated with the specified SEE action.

The SEE action specified by each action element 412, 414 may have zero or more associated parameters. Correspondingly, each action element 412, 414 may include an action parameters element such as action parameters element 416. The action parameters element 416 may include one or more action parameter elements. In FIG. 4, the action parameters element 416 is shown having two action parameter elements 418 and 420. However, an embodiment of the invention is not so limited. Each parameter of each SEE action may have a name and a value. Correspondingly, each action parameter element 418, 420 may specify the name of the parameter as well as a particular value for the parameter.

The specification of the value of the parameter in each action parameter element 418, 420 may include a SEE code variable specification. For example, the SEE code variable specification may include a SEE code variable name surrounded by SEE code variable specification delimiters. Each SEE code variable may have an associated value. For example, the value of each SEE code variable may be maintained by one of the action layers 308, 314, 316, 318 (FIG. 3). The scenario execution engine 302 may replace the SEE code variable specification with the value of the specified SEE code variable or a representation thereof. For example, if the SEE code variable specification is a string of alphanumeric text, it may be replaced with a string of alphanumeric text representing the value of the specified SEE code variable. The value of a particular SEE code variable may be set with the action parameter element 418, 420 by specifying the parameter name as one of a set of SEE code variable names such as "GlobalVariable," or "LoopVariable," and specifying the desired SEE code variable value as the parameter value.

The SEE action specified by each action element 412, 414 may be associated with zero or more expected errors. Correspondingly, each action element 412, 414 may include an expected errors element such as expected errors element 422. The expected errors element 422 may specify one or more expected errors. For example, the expected errors element 422 may include one or more expected error elements (not shown in FIG. 4) each specifying an expected error. An expected error specification may include an error name, an error value and/or any suitable set of name-value pairs.

Some SEE actions that may be specified by action elements 412, 414 are now described. Although the following are scenario execution engine actions associated with the scenario execution engine action layer 308 (FIG. 3), they may serve as schematic examples for SEE actions associated with any suitable action layer such as action layers 314, 316 and 318. Scenario execution engine actions may include a start loop action, an end loop action, a set event action, a reset event action, a wait event action, a log message action, a set environment action, an execute command action, and a reboot action.

The start loop action and the end loop action may delimit a set of SEE actions. Parameters of the start loop action may include a loop variable parameter, a start value parameter, an end value parameter and a step value parameter. Required parameters of the start loop action may include the loop variable parameter, the start value parameter and the end value parameter. The loop variable parameter may specify a name of a SEE code variable instance, i.e., the loop variable. The start value parameter may specify an initial value of the loop variable. The end value parameter may specify a final value of the loop variable. The step value parameter may specify a loop variable increment which may otherwise default to 1. Required parameters of the end loop action may include a loop variable parameter specifying the same loop variable specified by the loop variable parameter of the start loop action. The scenario execution engine 302 (FIG. 3) may repeatedly dispatch, in order, each SEE action in the delimited set of SEE actions while the loop variable has a value greater than the specified final value after being incremented with the specified increment following each repetition. Nested loops may be prohibited to limit SEE code complexity.

Each scenario thread may have an associated synchronization event object. The wait event action may suspend execution of a particular scenario thread until a specified synchronization event object is set by the set event action. The set event action may set the synchronization event associated with the scenario thread that contains the set event action. The wait event action may have a required event name parameter specifying a name of the synchronization event object, and/or its associated scenario thread, on which to wait. The wait event action may be contained in a scenario thread that is different from the scenario thread associated with the synchronization event object on which the wait event action is waiting. The reset event action may reset a particular synchronization event object, for example, after it has been set by the set event action. The reset event action may have a required event name parameter specifying a name of the synchronization event object, and/or its associated scenario thread, to reset. The reset event action may be contained in a scenario thread that is different from the scenario thread associated with the synchronization event object to be reset.

The log message action may add a message to the scenario execution log 320 (FIG. 3), for example, utilizing the SEE logging engine 310. The log message action may have a message parameter specifying, for example, an alphanumeric string to be added to the scenario execution log 320. The message parameter may be a required parameter of the log message action.

The scenario execution platform 218 (FIG. 2) may have an associated set of environment variables. The set environment action may set a value of one of the environment variables. Parameters of the set environment action may include a variable name parameter, a value parameter, and a session wide parameter. Required parameters of the set environment action may include the variable name parameter and the value parameter. The variable name parameter may specify a name of a particular environment variable to be set. The value parameter may specify a value to which to set the particular environment variable. The session wide parameter may specify that the particular environment variable be set either for a particular process environment associated with the scenario execution platform 219 or for an entire session. For example, a session wide parameter value of "true" may indicate that the particular environment variable be set for the entire session and the session wide parameter value may default to "false."

The scenario execution platform 218 (FIG. 2) may have an associated computer system command processor shell, for example, a command processor shell of one or more computers, such as the computer 102 (FIG. 1), that implement the scenario execution platform 218. The execute command action may pass a specified command to the command processor shell for execution. Parameters of the execution command action may include a command parameter, an argument string parameter, an exit variable parameter, an input file parameter and an output file parameter. The command parameter may specify the command to be executed by the command processor shell. The command parameter may be an alphanumeric string indicating a location (e.g., a file path) of an executable. The location of the executable may be contextualized by an existing search path. The command parameter may be a required parameter. The argument string parameter may specify arguments for the command. For example, the argument string parameter may be an alphanumeric string of command line options for the command. The exit variable parameter may specify a name of a SEE code variable instance. A return value of the command may be stored in the SEE code variable with the specified name. The input file parameter may specify a file to which a standard input of the command may be redirected. The output file parameter may specify a file to which a standard output of the command may be redirected.

The scenario specified by the scenario element 406 may include a computer system restart and/or rebuild. If the computer system to be restarted and/or rebuilt includes one or more computers that implement the scenario execution platform 218 (FIG. 2), then state of the scenario execution platform 218 may need to be temporarily stored outside of the computer system to be restarted and/or rebuilt. The reboot action initiates a shutdown and restart of the computer system to be restarted. The reboot action may have a required safe store parameter specifying a storage location, for example, a path to a file local or remote to the computer system to be restarted. In an embodiment of the invention, scenario execution may continue with a SEE action following the reboot action even if the restarted computer system includes one or more computers that implement the scenario execution platform 218.

Figure 5:
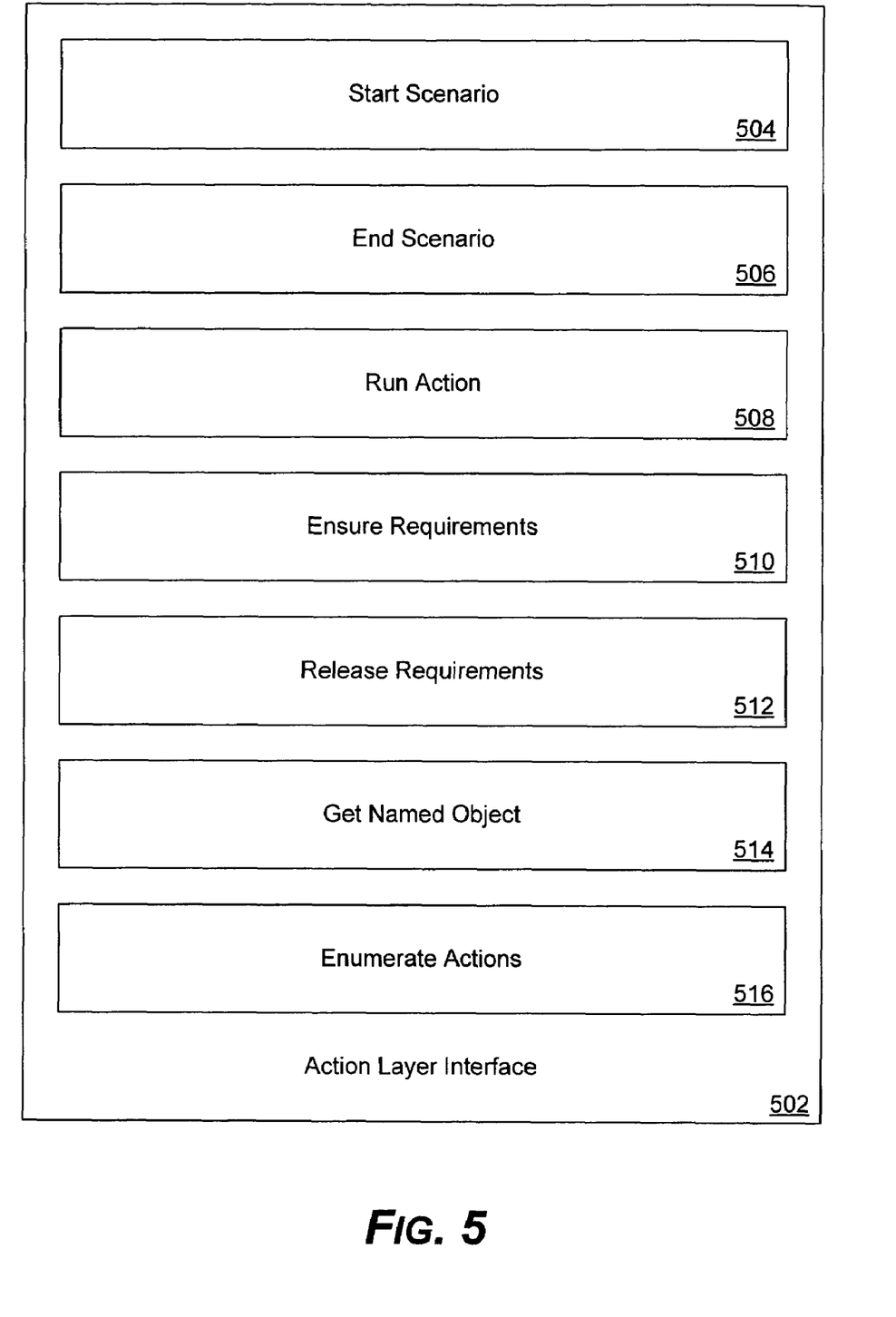
FIG. 5 is a data structure diagram depicting an example action layer interface in accordance with an embodiment of the invention.

The scenario execution engine 246 (FIG. 2) may receive SEE code in the SEE code format 400 and, in response, initiate SEE actions utilizing the action layer interface of action layers 220, 222, 224, 226, 228, 230. FIG. 5 depicts an example action layer interface 502 in accordance with an embodiment of the invention. The action layer interface 502 may include a start scenario element 504, an end scenario element 506, a run action element 508, an ensure requirements element 510, a release requirements element 512, a get named object element 514 and an enumerate actions element 516. Each action layer interface element 504, 506, 508, 510, 512, 514 and 516 may include one or more interface specifications that specify a manner in which computer system components may configure, control and/or interact with action layers 220, 222, 224, 226, 228, 230. As will be apparent to one of skill in the art, the interface specifications may include function call specifications, program object specifications, message specifications such as request/response message pairs, and/or any other suitable programming interface specification.

The start scenario element 504 of the action layer interface 502 may be utilized to inform action layers 206, 208, 210, 212, 214, 216 (FIG. 2) that a particular scenario or set of scenarios is commencing or is soon to commence. For example, an invocation of the start scenario element 504 may correspond to the scenario suite element 402 (FIG. 4) or the scenario element 406 of SEE code in the SEE code format 400. Similarly, the end scenario element 506 of the action layer interface 502 may be utilized to inform action layers 206, 208, 210, 212, 214, 216 that the particular scenario or set of scenarios has been concluded or is about to be concluded. For example, an invocation of the end scenario element 506 may occur when each action of a particular scenario has been dispatched, or when each scenario of a particular scenario suite has been executed.

Each scenario may have an associated set of resource requirements. For example, an amount of non-removable storage 112 (FIG. 1) at a particular computer 102, an amount of removable storage 110, sole use of a particular output device 120, and/or any suitable reservation of some or all of a shared or limited computer system resource. The ensure requirements element 510 of the action layer interface 502 may be utilized to inform action layers 206, 208, 210, 212, 214, 216 (FIG. 2) of the set of resource requirements and/or to instruct action layers 206, 208, 210, 212, 214, 216 to reserve each resource requirement in the set. The release requirements element 512 may be utilized to inform action layers 206, 208, 210, 212, 214, 216 of a set of resources that are no longer requirements and/or to instruct action layers 206, 208, 210, 212, 214, 216 to release each resource in the set for general use.

The run action element 508 of the action layer interface 502 may be utilized to inform action layers 206, 208, 210, 212, 214, 216 (FIG. 2) of one or more SEE actions and/or to instruct action layers 206, 208, 210, 212, 214, 216 to carry out (e.g., co-ordinate and/or perform) one or more SEE actions. In an embodiment of the invention, SEE code, such as SEE code corresponding to the action element 414 (FIG. 4), is provided to the run action element 508. However, each embodiment of the invention is not so limited, for example, the scenario execution engine 246 may parse, verify and/or transform the action element 414 and/or its sub-elements before providing some or all of the action element 414 to the run action element 508 in accordance with a particular interface specification of the run action element 508.

The get named object element 514 of the action layer interface 502 may enable components, for example, of the scenario execution platform 218 (FIG. 2), to request a value of a named object maintained by the action layer 206, 208, 210, 212, 214, 216. For example, the named object may be a SEE code variable instance as described above with respect to the action parameter element 418, 420 (FIG. 4). The enumerate actions element 516 of the action layer interface 502 may enable components, for example, of the scenario execution platform 218, to request a copy of and/or a reference to a data structure representing a set of SEE actions capable of being handled by the run action element 508. For example, the data structure may reference each SEE action capable of being performed by the action layer 206, 208, 210, 212, 214, 216. In an embodiment of the invention, the action layer interface 502 inherently includes such an enumeration as part of its specification and the enumerate actions element 516 may be implemented with a conventional computer system component interface specification parser.

Figure 6:
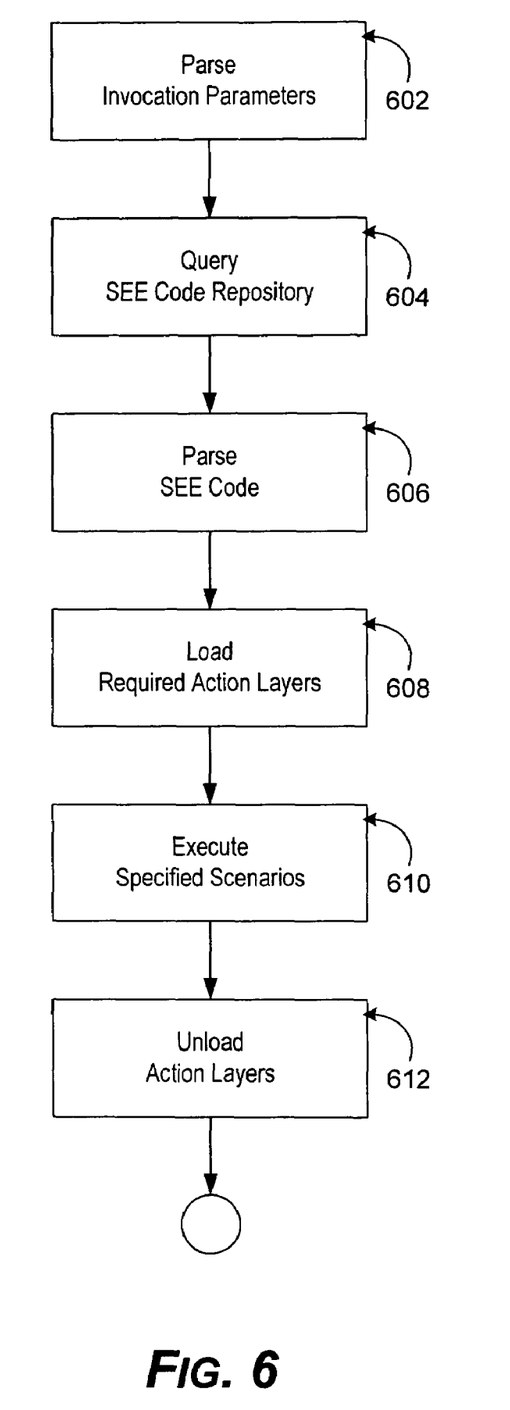
FIG. 6 is a flowchart depicting example steps performed in a scenario execution environment in accordance with an embodiment of the invention.

Computer system components and data structures in accordance with an embodiment of the invention have been described. Example steps that may be performed by the computer system components and that may utilize the data structures are now described. FIG. 6 depicts example steps that may be performed in the scenario execution environment 200 (FIG. 2) in accordance with an embodiment of the invention. For example, each of the steps depicted in FIG. 6 may be initiated and/or performed by the scenario execution engine 246.

At step 602, invocation parameters may be parsed. For example, the scenario execution engine 246 (FIG. 2) may be invoked by the SEE viewer 250 to execute a scenario specified by SEE code in the SEE code file 244. Invocation parameters may include one or more names of action layers 206, 208, 210, 212, 214, 216 to be loaded, a name of a scenario suite or a name of a particular SEE code file 242, 244, a verification level parameter, an error level at which to exit parameter, a name of a log file, a log detail level parameter, and/or a no pop-ups parameter. Each such name may include a location qualifier such as a file path, a uniform resource locator (URL), or the like.

The names of action layers 206, 208, 210, 212, 214, 216 (FIG. 2) to be loaded may override or be complementary to any such action layers 206, 208, 210, 212, 214, 216 specified by SEE code, for example, by the required providers element 404 (FIG. 4). The name of the scenario suite may reference a scenario suite to be executed corresponding to a particular scenario suite element 402. The name of the SEE code file may reference a particular SEE code file 242, 244 containing SEE code to be executed.

The verification level parameter may indicate an action verification procedure for verifying SEE actions. Suitable action verification procedure designations may include full verification, minimal verification, same interface verification and deep interface verification. The full verification designation may indicate that full verification should occur for each action unless otherwise specified in the associated SEE code. This may be the default designation. The minimal verification designation may indicate that minimal verification should be performed for each action, for example, verification may be limited to checking that the action result is "pass" and not "fail." The same interface verification designation may indicate that action verification should occur at a same interface level. For example, if action verification includes repetition of the action, then the same set of interfaces 206, 208, 210, 212, 214, 216 (FIG. 2) should be utilized for the repetition as was utilized for the original. In contrast, the deep interface verification designation may indicate that action verification should occur at a deeper interface level than that at which the original action occurs. For example, if the application programming interface 210 of the service 202 is a lower level interface than the graphical user interface 206, and an original set of actions includes activation of elements of the graphical user interface 206, then verification of the set of actions may include activation of corresponding elements of the application programming interface 210.

The error level at which to exit parameter may indicate an error severity threshold above which scenario suite execution does not continue. For example, failures may occur at a thread, scenario or scenario suite level and the default threshold may be set at the scenario suite level. The name of the log file may specify that a log file should be created for the scenario suite to be executed. This may be the scenario execution log 320 (FIG. 3) or else be in addition to the scenario execution log 320 described above. Each log message may have an associated detail level. The log detail level parameter may specify a detail level threshold that excludes log messages with a higher associated detail level from the log file. The no pop-ups parameter may indicate whether or not to interrupt scenario execution with a graphical user interface dialog if an error occurs.

At step 604, the SEE code repository 236 (FIG. 2) may be queried. For example, the scenario execution engine 246 may query the SEE code repository 236 for a particular scenario suite or SEE code file 242, 244 specified in the invocation parameters. At step 606, SEE code may be parsed. For example, SEE code specifying the particular scenario suite or contained in the SEE code file 242, 244 queried from the SEE code repository 236. The SEE code may be parsed by the SEE code parser 304 (FIG. 3).

At step 608, required action layers may be loaded. For example, the scenario execution engine 302 (FIG. 3) may load the action layers 314, 316, 318 specified by the SEE code and/or in the invocation parameters. At step 610, scenarios may be executed. For example, scenarios specified by the SEE code may be executed in the scenario execution environment 200 (FIG. 2). Details of scenario execution are described below with reference to FIG. 7. At step 612, action layers may be unloaded. For example, some or all of the action layers 314, 316, 318 loaded at step 608 may be unloaded. The loading and unloading of action layers may be optimized with a conventional predictive caching mechanism.

Figure 7:
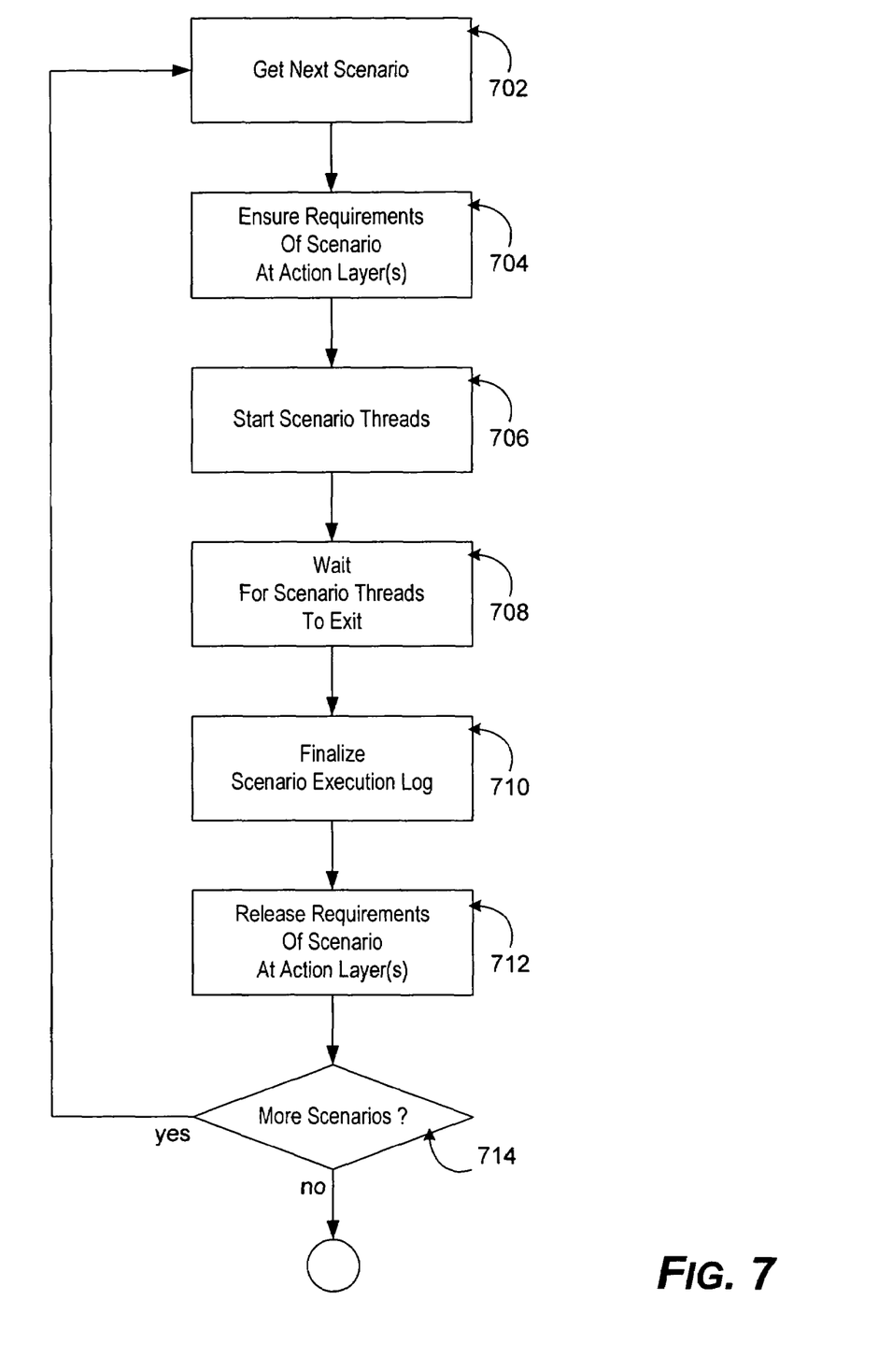
FIG. 7 is a flowchart depicting example steps for executing scenarios in accordance with an embodiment of the invention.

FIG. 7 depicts example steps that may be performed to execute scenarios in accordance with an embodiment of the invention. For example, each of the steps depicted in FIG. 7 may be initiated and/or performed by the scenario execution engine 246 (FIG. 2). At step 702, a next (or an initial) scenario may be selected. For example, the SEE code parsed at step 606 (FIG. 6) may specify one or more scenarios for execution and one of these may be selected at step 702. The scenarios specified by the SEE code may have an order and they may be selected in that order at step 702.

At step 704, resource requirements of the selected scenario may be ensured at one or more of action layers 314, 316, 318 (FIG. 3). For example, each action layer 314, 316, 318 may have an interface in accordance with the action layer interface 502 (FIG. 5) and the resource requirements of the selected scenario may be ensured at each action layer 314, 316, 318 through the ensure requirements element 510 of the action layer interface 502. At step 706, scenario threads may be started. For example, scenario threads corresponding to scenario thread elements 408, 410 (FIG. 4) of SEE code in the SEE code format 400. Example steps that may be performed by scenario threads in accordance with an embodiment of the invention are described below in more detail with reference to FIG. 8.

At step 708, a thread of execution may wait for the scenario threads started at step 706 to exit. For example, the thread of execution that started the scenario threads may wait for them to exit. In an embodiment of the invention, step 708 may timeout from waiting, for example, if the scenario threads do not exit within a specified timeout period. At step 710, the scenario execution log 320 (FIG. 3) for the selected scenario may be finalized. For example, an associated file may be closed or SEE database 234 (FIG. 2) transaction committed. In an embodiment of the invention, the scenario execution log 320 is not finalized until each scenario in an associated scenario suite has finished executing.

At step 712, resource requirements of the selected scenario may be released at one or more of the action layers 314, 316, 318 (FIG. 3). For example, each action layer 314, 316, 318 may have an interface in accordance with the action layer interface 502 (FIG. 5) and the resource requirements of the selected scenario may be released at each action layer 314, 316, 318 through the release requirements element 512 of the action layer interface 502. In an embodiment of the invention, the resource requirements that are released at step 712 are the same resource requirements that were ensured at step 704.

At step 714, it may be determined whether there are more scenarios to be selected. For example, it may be determined whether there are more scenarios in a particular scenario suite specified by the scenario suite element 402 (FIG. 4) of SEE code in the SEE code format 400. If there are more scenarios to be selected, then the thread of execution may return to step 702. Otherwise, the thread of execution may progress, for example, to step 612 of FIG. 6.

Figure 8:
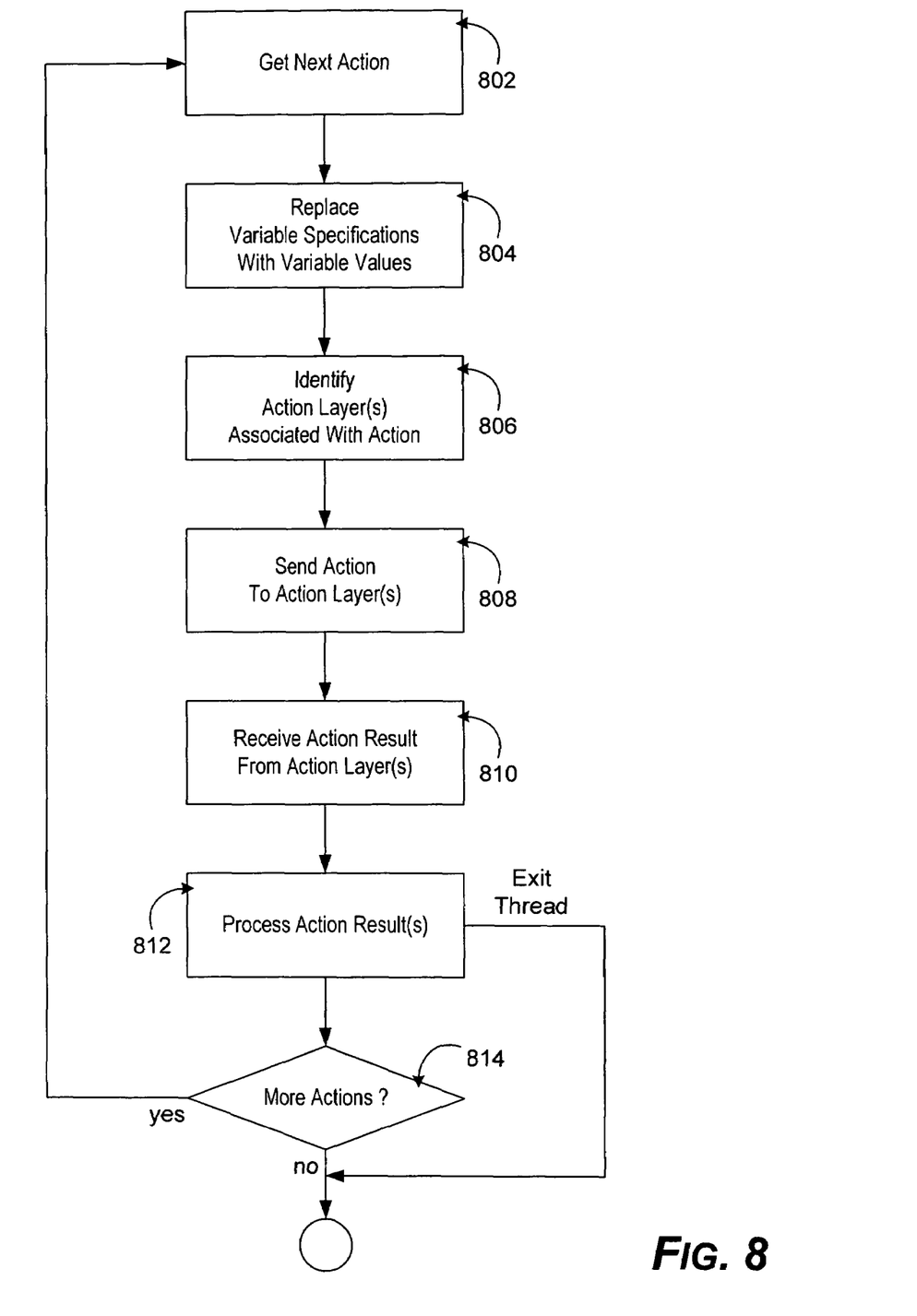
FIG. 8 is a flowchart depicting example steps performed by scenario threads in accordance with an embodiment of the invention.

FIG. 8 depicts example steps that may be performed by scenario threads in accordance with an embodiment of the invention. For example, each of the steps depicted in FIG. 8 may be initiated and/or performed by scenario threads started at step 706 of FIG. 7. At step 802, a next (or an initial) action may be selected. For example, the SEE code parsed at step 606 (FIG. 6) may specify one or more actions associated with a particular scenario thread, and one of these may be selected. The actions specified by the SEE code may have an order and they may be selected in that order.

At step 804, variable specifications may be replaced with variable values. For example, SEE code variable specifications in action parameter elements 418, 420 (FIG. 4) may be replaced with values retrieved from action layers 314, 316, 318 (FIG. 3) with the get named object element 514 (FIG. 5) of the action layer interface 502. At step 806, one or more action layers 314, 316, 318 associated with the selected action may be identified. For example, the action specified by the action element 412 may be associated with the action layer 314 and the action specified by the action element 414 may be associated with the action layer 316. The association between action and action layer may be determined from an action to action layer map. For example, the action to action layer map may be maintained by the SEE database 234 (FIG. 2) from information provided by the action layer registration tool 232.

At step 808, the selected action may be sent (e.g., dispatched) to each action layer 314, 316, 318 (FIG. 3) identified at step 806. For example, the selected action may be sent to the run action element 508 (FIG. 5) of the action layer interface 502 of each identified action layer 314, 316, 318. At step 810, an action result may be received from each action layer 314, 316, 318 to which the selected action was sent, for example, at step 808. At step 812, each action result may be processed, for example, by the SEE action dispatcher 306. Depending upon the action results, the scenario thread may progress to step 814, or else the scenario thread may exit. Further details with respect to action result processing are described below with reference to FIG. 9.

At step 814, it may be determined whether there are more actions to be selected. For example, more actions associated with the scenario thread element 410 (FIG. 4) of the SEE code. If there are more actions to be selected, the scenario thread may return to step 802. Otherwise, the scenario thread may exit.

Figure 9:
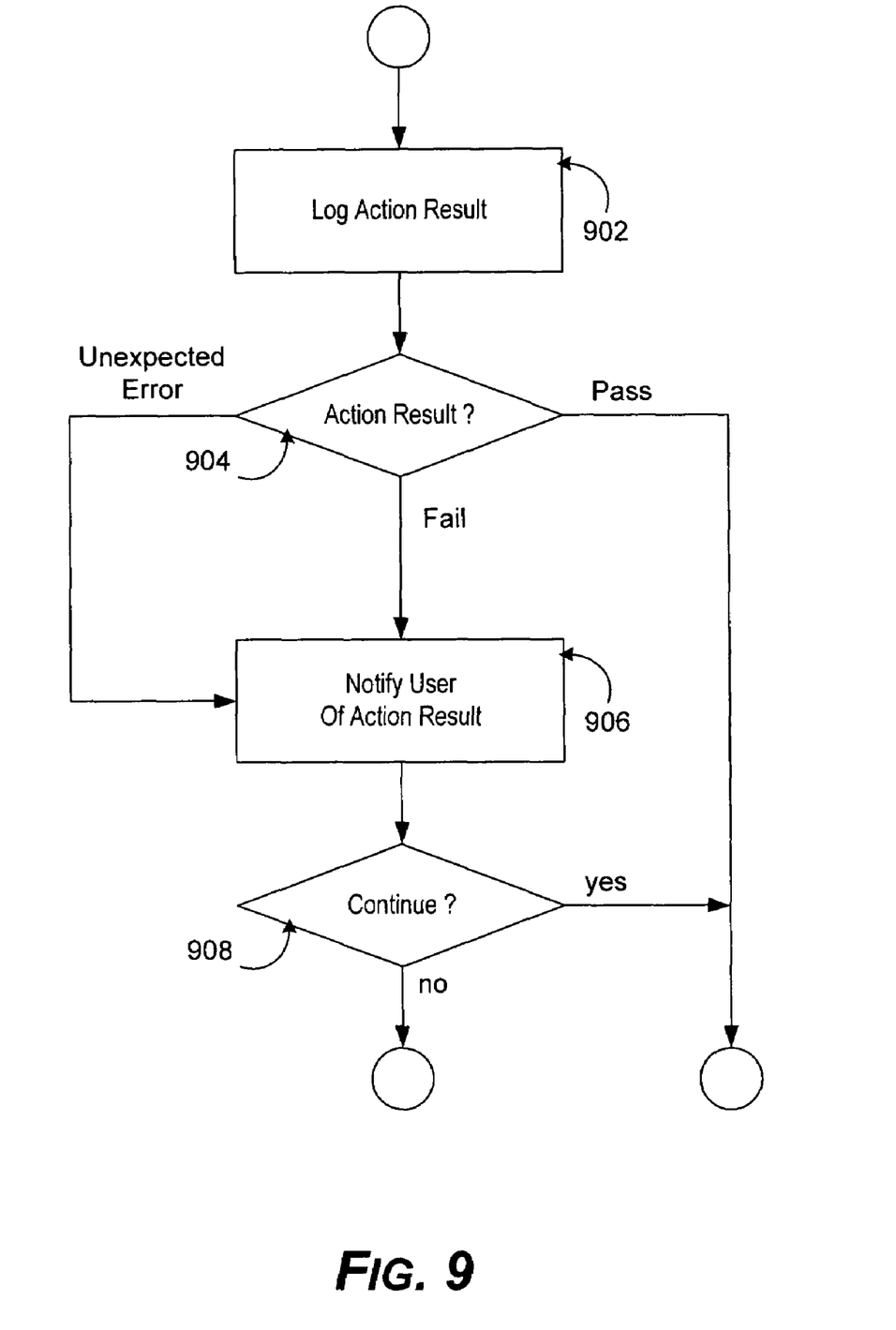
FIG. 9 is a flowchart depicting example steps for processing an action result in accordance with an embodiment of the invention.

FIG. 9 depicts example steps that may be performed to process an action result in accordance with an embodiment of the invention. At step 902, the action result may be logged. For example, the action result may be logged to the scenario execution log 320 (FIG. 3) with the SEE logging engine 310. Action result logging may be limited and/or disabled, for example, depending on one or more of the invocation parameters parsed at step 602 (FIG. 6) such as the log level detail parameter.

At step 904, a type of the action result may be determined. For example, as shown in FIG. 9, the type of the action result (the action result type) may be a pass, a fail, or an unexpected error. If the type of the action result is a pass, then the scenario thread may progress, for example, to step 814 (FIG. 8). If the type of the action result is a fail or an unexpected error, then the scenario thread may progress to step 906.

At step 906, a computer system user may be notified of the action result. For example, the scenario execution engine 246 (FIG. 2) may display a graphical notification dialog through and/or associated with the SEE viewer 250 that initiated execution of the scenario suite. In response to the graphical notification dialog, the computer system user may choose to exit the scenario thread or to continue with execution.

At step 908, it may be determined whether to continue with execution. For example, if the computer system user has chosen to continue with execution, the scenario thread may progress to step 814 (FIG. 8). Otherwise, the scenario thread may exit. In an embodiment of the invention, step 906 is suppressed if the no pop-ups parameter of the invocation parameters is set and the determination at step 908 may be made independent of computer system user choice, for example, the determination may be a function of a value of the error level at which to exit parameter of the invocation parameters.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A computer-implemented method of a scenario execution environment having a plurality of action layers, the method comprising:

in a processor:

parsing scenario execution environment code having a scenario operative with a plurality of interfaces of a service, the scenario execution environment code specifying at least one scenario execution environment action for the scenario, the scenario execution environment action having a scenario execution environment variable specification;

identifying at least one of the plurality of action layers associated with said at least one scenario execution environment action specified by the scenario execution environment code, the at least one of the plurality of action layers configured to interact with at least one of the plurality of interfaces by having the scenario execution environment action activate an element of the at least one of the plurality of interfaces of the service;

replacing the scenario execution environment variable specification with a variable value retrieved from the at least one of the plurality of action layers;

dispatching said at least one scenario execution environment action, as modified with the variable value, to said at least one of the plurality of action layers identified as being associated with said at least one scenario execution environment action; and processing an action result returned by said at least one of the plurality of action layers.

2. The method of claim 1 wherein:
the scenario execution environment code has a format comprising at least one scenario element; and
each scenario element comprises at least one action element.

3. The method of claim 2, wherein the format of the scenario execution environment code further comprises at least one required providers element specifying said at least one of the plurality of action layers.

4. The method of claim 3, wherein:
the format of the scenario execution environment code further comprises a scenario suite element;
the scenario suite element comprises said at least one scenario element;
each scenario element further comprises at least one scenario thread element;
said at least one scenario thread element comprises said at least one action element; and
each action element comprises at least one action parameter element.

5. The method of claim 1, wherein each of the plurality of action layers has an interface in accordance with an action layer interface comprising:
a start scenario element for informing the action layer that at least one scenario specified by the scenario execution environment code is commencing, each scenario specified by the scenario execution environment code comprising at least one scenario execution environment action;
an end scenario element for informing the action layer that said at least one scenario specified by the scenario execution environment code is concluding; and
a run action element for instructing the action layer to carry out said at least one scenario execution environment action of said at least one scenario specified by the scenario execution environment code.

6. The method of claim 1, wherein:
the scenario execution environment code further specifies at least one scenario comprising said at least one scenario execution environment action;
said at least one scenario specified by the scenario execution environment code has an associated set of computer system resource requirements; and
the method further comprises:
ensuring the set of computer system resource requirements associated with said at least one scenario specified by the scenario execution environment code at one or more of the plurality of action layers; and
releasing the set of computer system resource requirements associated with said at least one scenario specified by the scenario execution environment code at said one or more of the plurality of action layers.

7. The method of claim 6, wherein:
each of the plurality of action layers has an interface in accordance with an action layer interface comprising:
an ensure requirements element for instructing the action layer to reserve computer system resource requirements; and
a release requirements element for instructing the action layer to release computer system resource requirements;
ensuring the set of computer system resource requirements associated with said at least one scenario specified by the scenario execution environment code at one or more of the plurality of action layers comprises invoking the ensure requirements element of each action layer; and releasing the set of computer system resource requirements associated with said at least one scenario specified by the scenario execution environment code at said one or more of the plurality of action layers comprises invoking the release requirements element of each action layer.

8. The method of claim 1, wherein:
the scenario execution environment code is dynamically generated by a scenario execution environment database; and
the method further comprises querying the scenario execution environment database for the scenario execution environment code.

9. The method of claim 1, wherein:
the scenario execution environment code further specifies at least one required action layer;
each required action layer specified by the scenario execution environment code is one of the plurality of action layers of the scenario execution environment; and
the method further comprises:
loading each required action layer; and
unloading each required action layer.

10. A computer-readable storage medium comprising computer-executable modules for a scenario execution environment, the modules comprising:
a plurality of action layers;
the scenario execution environment code comprises at least one scenario execution environment code variable specification;
a scenario execution engine configured to, at least;
parse the scenario execution environment code;
identify at least one of the plurality of action layers as associated with said at least one scenario execution environment action specified by the scenario execution environment code;
replace the scenario execution environment variable specification with a variable value retrieved from the at least one of the plurality of action layers; and
dispatch said at least one scenario execution environment action, as modified with the variable value, to said at least one of the plurality of action layers identified as being associated with said at least one scenario execution environment action;
at least one computer system service; and
at least one interface for each of said at least one computer system service; and each action layer corresponds to one of said at least one interface.

11. The computer-readable storage medium claim 10, further comprising: a scenario execution environment database; and an action layer registration tool configured to, at least, register each action layer with the scenario execution environment database.

12. The computer-readable storage medium of claim 11, wherein: each action layer implements a set of scenario execution environment actions; and registering each action layer with the scenario execution environment database comprises registering the set of scenario execution environment actions implemented by each action layer.

13. The computer-readable storage medium of claim 10, wherein each of the plurality of action layers has an interface in accordance with an action layer interface comprising: a start scenario element for informing the action layer that at least one scenario of the scenario execution environment is commencing, at least one of said at least one scenario of the scenario execution environment comprising said at least one scenario execution environment action specified by the scenario execution environment code; an end scenario element for informing the action layer that said at least one scenario of the scenario execution environment is concluding; and a run action element for instructing the action layer to carry out said at least one scenario execution environment action specified by the scenario execution environment code.

14. A computerized system comprising computer-readable storage medium having computer-executable instructions that, when executed, implement an action layer interface for interfacing with an action layer in a scenario execution environment, the action layer interface comprising:

a start scenario element for informing the action layer that at least one scenario of the scenario execution environment is commencing, each scenario of the scenario execution environment comprising at least one scenario execution environment action;

an end scenario element for informing the action layer that said at least one scenario of the scenario execution environment is concluding; and a get named object element for retrieving from the action layer a value corresponding to a scenario execution environment code variable specification; and a run action element for instructing the action layer to carry out said at least one scenario execution environment action of said at least one scenario of the scenario execution environment, said at least one scenario execution environment action being modified with the variable value, wherein the action layer is associated with a computer system service through an interface among a plurality of interfaces of the computer system service, wherein scenario execution environment code having the at least one scenario is parsed, the scenario operative with the plurality of interfaces of the computer system service, the scenario execution environment code specifying said at least one scenario execution environment action for the scenario, the scenario execution environment action having the scenario execution environment code variable specification.

15. The computerized system of claim 14, wherein the action layer interface further comprises: an ensure requirements element for instructing the action layer to reserve a set of resources of the computerized system associated with said at least one scenario of the scenario execution environment; and a release requirements element for instructing the action layer to release the set of resources of the computerized system associated with said at least one scenario of the scenario execution environment.

16. The computerized system of claim 14, wherein: each scenario of the scenario execution environment is specified with scenario execution environment code; scenario execution environment code has a format in accordance with a scenario execution environment code format; the scenario execution environment code format comprises at least one scenario element; and each scenario element comprises at least one action element.

17. The computerized system of claim 16, wherein: each scenario execution environment action is implemented by at least one of the plurality of action layers; and each scenario execution environment action corresponds to one of said at least one action element.

18. The computerized system of claim 14, wherein:

each scenario of the scenario execution environment is specified with scenario execution environment code; and the scenario execution environment code comprises at least one scenario execution environment code variable specification; the scenario execution environment code variable being among said at least one scenario execution environment code variable specification.

\* \* \* \* \*